(12) United States Patent
Bonelli

(10) Patent No.: US 8,864,012 B2
(45) Date of Patent: Oct. 21, 2014

(54) METHOD AND APPARATUS FOR THE WELDING OF PIPES

(75) Inventor: Renato Bonelli, Matelica (IT)

(73) Assignee: Saipem S.p.A., San Donato Milanese (IT)

( * ) Notice: Subject to any disclaimer, the term of this patent is extended or adjusted under 35 U.S.C. 154(b) by 58 days.

(21) Appl. No.: 12/864,598

(22) PCT Filed: Jan. 19, 2009

(86) PCT No.: PCT/EP2009/000287
§ 371 (c)(1), (2), (4) Date: Jul. 29, 2010

(87) PCT Pub. No.: WO2009/095166
PCT Pub. Date: Aug. 6, 2009

(65) Prior Publication Data
US 2010/0301103 A1   Dec. 2, 2010

(30) Foreign Application Priority Data
Feb. 1, 2008   (GB) .................................. 0801917.6

(51) Int. Cl.
*B23K 31/02* (2006.01)
*B23K 9/02* (2006.01)
*B23K 9/028* (2006.01)

(52) U.S. Cl.
CPC ........... *B23K 9/0286* (2013.01); *B23K 2201/10* (2013.01); *B23K 9/0216* (2013.01)
USPC ........................... 228/225; 228/49.3; 228/227

(58) Field of Classification Search
USPC ........................................................ 228/227
See application file for complete search history.

(56) References Cited

U.S. PATENT DOCUMENTS 3,748,426 A * 7/1973 Stanley ....................... 219/60 A
4,047,419 A * 9/1977 Hookings et al. .......... 72/370.08
(Continued)

FOREIGN PATENT DOCUMENTS

EP   1 077 785 A1   2/2001
GB   2 274 420      7/1994
(Continued)

OTHER PUBLICATIONS

International Search Report (PCT/ISA/210) issued on Jun. 22, 2009 by the European Patent Office as the International Searching Authority for International Application No. PCT/EP2009/000287.

(Continued)

*Primary Examiner* — Kiley Stoner
(74) *Attorney, Agent, or Firm* — Buchanan Ingersoll & Rooney PC

(57) ABSTRACT

Two pipes are arranged end to end, the pipes being shaped such that a groove is defined between the ends of the pipe. A plurality of welding torches are used to weld in the groove, such that at least some of the welding torches perform a first welding pass, the welding characteristics of the torches are adjusted and at least some of the welding torches are used to perform a second welding pass. At least one torch welds in a first sector in the first welding pass and a second sector in the second welding pass, the second sector being different to the first. The sectors might overlap or might not overlap.

18 Claims, 4 Drawing Sheets

(56) References Cited

U.S. PATENT DOCUMENTS

| | | | |
|---|---|---|---|
| 4,145,593 A | | 3/1979 | Merrick et al. |
| 4,322,596 A | * | 3/1982 | Krakow et al. ............ 219/73.21 |
| 4,525,616 A | * | 6/1985 | Slavens ...................... 219/60 R |
| 5,126,523 A | | 6/1992 | Rinaldi |
| 5,347,101 A | * | 9/1994 | Brennan et al. .......... 219/124.34 |
| 6,373,020 B1 | * | 4/2002 | Fujita et al. ..................... 219/87 |
| 6,429,405 B2 | | 8/2002 | Belloni et al. |
| 6,450,395 B1 | * | 9/2002 | Weeks et al. ............... 228/112.1 |
| 2001/0015349 A1 | | 8/2001 | Belloni et al. |
| 2001/0017292 A1 | * | 8/2001 | Belloni et al. ........... 219/125.11 |
| 2002/0162828 A1 | * | 11/2002 | Spooner et al. .......... 219/121.63 |
| 2007/0023479 A1 | * | 2/2007 | Koppert et al. ............... 228/101 |
| 2010/0006627 A1 | * | 1/2010 | Bonelli et al. ................ 228/212 |
| 2013/0008881 A1 | * | 1/2013 | Berbakov ..................... 219/136 |

FOREIGN PATENT DOCUMENTS

| | | | |
|---|---|---|---|
| GB | 2 345 016 A | | 6/2000 |
| JP | 57-106492 A | * | 7/1982 |
| JP | 04-319075 A | * | 11/1992 |
| JP | 06-285639 A | * | 10/1994 |
| JP | 8-025050 A | | 1/1996 |
| JP | 09-262664 A | * | 10/1997 |
| JP | 09-262665 A | * | 10/1997 |
| WO | WO 00/38872 A1 | | 6/2000 |
| WO | WO 2004/071702 A1 | | 8/2004 |
| WO | WO 2007/110514 A1 | | 10/2007 |
| WO | WO 2008/052632 A1 | * | 5/2008 |
| WO | WO 2008/052632 A1 | | 5/2008 |

OTHER PUBLICATIONS

Written Opinion (PCT/ISA/237) issued on Jun. 22, 2009 by the European Patent Office as the International Searching Authority for International Application No. PCT/EP2009/000287.

United Kingdom Search Report dated May 27, 2008.

* cited by examiner

METHOD AND APPARATUS FOR THE WELDING OF PIPES

TECHNICAL FIELD

The present invention relates to a method and apparatus for welding pipes together. More particularly, but not exclusively, the invention relates to welding together pipe sections wheal laying pipelines.

BACKGROUND OF THE INVENTION

The present invention is particularly, but not exclusively, concerned with a welding process used when laying pipes underwaiter, for example, when laying large diameter pipes with a pipe-laying vessel in the "S" laying configuration. Underwater pipelines are usually made up of many sections of pipe that are joined together by welding on a pipe laying vessel. The pipe-laying process is a costly and time consuming one. Each welded joint of a pipeline typically consists of several separate weld layers and the welding process is a significant contributor to the time taken to lay a pipeline. It is therefore desirable to reduce the time taken to weld a pipe section to the pipeline.

In a typical welding process, two adjoining pipes are welded together by a welding torch, or plurality of welding torches, such that a weld layer is created, the welding torch or torches are turned off and returned to their initial position, a further weld layer is created, and so on until the pipes are welded together as desired. The idling time, meaning the time for which the welding torches are turned off, can be as much as 20 to 30 seconds per lay cycle or even more. If a plurality of welding torches are used to build up the weld layers, for example a first welding torch creating a weld layer and a second welding torch following the first welding torch creating a second weld layer, a delay can be created by the time gap required to prevent the welding torches colliding with each other as they move around the pipes, or alternatively the time gap required to let the initial weld layer solidify sufficiently to allow a return pass to be made.

U.S. Pat. No. 4,145,593 discloses an automatic pipe welding system that includes a plurality of welding torches mounted on first and second torch transport assemblies, each torch transport assembly including two welding torches separated by 90 degrees around the circumference of the joint. In this case, the two pipes are horizontal, as is typical for a pipeline being laid in an S-lay configuration. The first and second torch transport assemblies are arranged such that each transport assembly welds one half of the joint from the top to the bottom of the joint. U.S. Pat. No. 4,145,593 states that the weld becomes more difficult as the welding torches depart from the 12 o'clock or upright positions and travel around the pipe joint. The welding torches weld a 90 degree sector of the joint and are then returned to their starting position as quickly as possible to begin the next welding sequence. There is therefore a delay before the next welding pass can be commenced, the length of the delay depending on how fast the torches can be returned to their starting positions.

SUMMARY OF THE INVENTION

The present invention seeks to overcome or mitigate at least one of the above mentioned disadvantages.

The invention provides a method of welding two pipes together comprising the steps of: arranging two pipes end to end, the pipes being so shaped that a circumferentially extending groove is defined between the ends of the pipes, providing a plurality of welding torches for welding in the groove, using at least some of the plurality of welding torches to perform a first welding pass, adjusting the welding characteristics of the plurality of welding torches, and using at least some of the plurality of welding torches to perform a second welding pass, wherein at least one torch welds in a first sector in the first welding pass and a second sector in the second welding pass, the second sector being different from the first.

Pipeline diameters are typically in the range of 10 to 60 inches (250 mm to 1525 mm), although it will be appreciated that the present invention may have application in relation to pipes having diameters outside of that range. The pipes being welded together may comprise a steel inner pipe with an outer coating of concrete. The concrete may have been cut back at the ends of the pipe sections so as to reveal the steel inner pipe. The end of the cut back sections may have been bevelled so as to form a groove suitable for welding.

A sector is a circumferential section of the groove which is being welded, so for example, a groove may comprise of 4 to 20 sectors. The sectors may be fixed circumferential arcs of the groove, so that a first sector is always between 0 degrees and 30 degree, a second sector being between 30 degrees and 60 degrees and so on. Alternatively, the sectors may overlap to some extent. For example, during the first welding pass, the first sector may be between 0 degrees and 30 degrees, and the second sector, during the second welding pass, being between 25 degrees and 55 degrees. Preferably there are more than 4 sectors in each welding pass performed by the method of the invention. There may be 8 or more sectors. Preferably there are 12 or more sectors.

Advantageously, the method reduces the time taken to weld two pipes together. The method allows a number of weld layers to be built up without the need to return welding heads to their initial position while in an idle state. Once a weld layer has been created on a particular sector of the groove by a certain welding torch, a further weld layer can be created by a following welding torch.

Additionally, the method may comprise the steps of adjusting the welding characteristics of the welding torches after the second welding pass, and using at least some of the plurality of welding torches to perform a third welding pass, wherein at least one torch welds in a first sector in the first welding pass, a second sector in a second welding pass, and a third sector in the third welding pass, the first, second, and third sectors being different from each other.

Preferably, each of the welding torches used in a welding pass weld a particular sector only once. Once a particular sector has been welded by a welding torch, that sector is preferably not welded again by that same welding torch. A sector may be partially welded by the same welding torch more than once during separate welding passes, but not the whole sector.

As mentioned above, the sectors may be substantially distinct from each other. The method may be performed such that each sector is welded by a particular welding torch no more than once during the welding process. Preferably, the circumferential extent of the sectors is the same in respect of successive welding passes (preferably the majority of passes, and more preferably for all passes). The sectors may be such that there is no overlap between successive sectors. The sectors are preferably arranged such that during each welding pass each welding torch welds within one sector and not in any other sector. It will of course be appreciated that the start or end of the weld performed by a given torch during a given welding pass may merge with the start or end of the weld performed by another torch as a result of the welding process.

Any such merging of the welds should not be considered as the performance of a weld in two sectors.

The groove may be notionally divided into two circumferential sides. Preferably each circumferential side of the groove comprises a plurality of sectors of the groove. A first plurality of welding torches may weld one circumferential side of the groove and a second plurality of welding torches may weld the other circumferential side of the groove. The two opposite circumferential sides of the groove preferably divide the groove into a first and second half. The welding passes on the opposite circumferential sides of the groove are preferably performed approximately simultaneously. The welding passes on the opposite circumferential sides of the groove are preferably made in opposite directions. Preferably, more than half of the welding passes on one circumferential side are in the same direction. Advantageously, all of the welding passes on one circumferential side are performed in the same direction. For welding passes to be in the same direction the welding torches performing those welding passes move around the groove in the same rotational direction, for example, clockwise or anticlockwise.

The circumferential sides of the groove are not to be confused with the groove comprising a first pipe side and a second pipe side, the first pipe side comprising the bevelled edge of the first pipe and the second pipe side comprising the bevelled edge of the second pipe. The first plurality of welding torches that may weld one circumferential side of the groove may be arranged to weld from the first pipe side of the groove, i.e. being disposed around the first pipe and welding towards the groove. The second plurality of welding torches that may weld the other circumferential side of the groove may be arranged to weld from the second pipe side of the groove, i.e. being disposed around the second pipe and welding towards the groove.

Preferably the two pipes being welded together are non-vertical. Preferably the two pipes being welded together have their central axes disposed in an approximately horizontal plane and the welding passes are performed in a descending manner. For a welding pass to be performed in a descending manner the welding pass finishes at a lower point from where it starts. This has advantages when welding generally horizontal pipes with regard to the effect of gravity on the weld. Typically, when pipes are generally horizontal when being welded they are being laid in an S-lay configuration.

Alternatively, the pipes may be generally vertical and the welding passes may be performed in a generally horizontal plane. Typically, when pipes are generally vertically disposed when being welded they are being laid in a J-lay configuration.

The method may comprise performing a plurality of welding passes, such that each welding pass comprises each of the different sectors being welded by a different welding torch from that which performed the preceding welding pass of each sector. Preferably, each sector is welded by a particular welding torch once only.

Advantageously, a plurality of welding torches are arranged to weld a sector in sequence, one torch subsequently following on from another. The welding torches may be arranged to build up a number weld layers on a sector, each weld layer being created by a welding torch following the welding torch which created the previous layer.

Advantageously, a method of welding as described removes the necessity to reciprocate a welding torch back and forth over a section to create a number of weld layers, therefore eliminating the non-welding idle time of a welding torch when it has finished one weld layer and is being returned to its start position to begin a further weld layer on top of the weld layer that has just been created.

Advantageously, each weld layer on a sector, other than the first weld layer, is created by the welding torch which created the preceding weld layer on a sector adjacent to the said sector, or a previous sector to the said sector. Advantageously, the sectors of the groove make up the entire circumference of the groove. Advantageously, a plurality of weld layers may be built up without any welding torches being required to return to a previously welded sector of the pipe while being idle. The number of weld layers created in this way may range from 2 to 20, more preferably in the range from 3 to 9.

At least some of the plurality of welding torches may perform a plurality of welding passes, each welding pass being performed on different sectors of the groove, the welding passes proceeding in a stepped arrangement. The step of welding in a stepped arrangement may comprise a welding torch performing a first weld at a particular weld layer, the welding torch then proceeding to the adjacent sector, whereby it performs a second weld on top of a weld layer previously created on the adjacent sector by a different welding torch, the torch thereby building up the weld layers in steps.

The method may include performing the step of previously dormant welding torches joining the welding process. The method may include the step of previously active welding torches leaving the welding process and becoming dormant. Preferably, during at least part of the method, the active welding torches are sandwiched between dormant torches.

The method may further comprise the step of moving any welding torch not performing a welding pass to a disengaged position in which the welding torch is positioned away from the groove. When a welding torch is in a disengaged position, it may be positioned on the opposite circumferential side of the groove to that which it is arranged to weld.

Advantageously, this means a greater number of welding torches can be accommodated in welding positions on the circumferential side of the groove that is being welded. Advantageously, a welding torch in a disengaged position does not obstruct welding torches which are operating around the groove, for example on the opposite circumferential side of the groove. Advantageously, a welding torch in a disengaged position from a first plurality of welding torches arranged to weld one circumferential side of the groove does not obstruct a welding torch from a second plurality of welding torches in an engaged position on the opposite circumferential side of the groove.

The following possible features of the invention relate to a method of welding a single circumferential side of the groove. The number of welding torches used may be at least two more than the number of weld layers that are built up. The number of welding torches used may be at least two more than the number of sectors the groove is notionally divided into. Advantageously, it may be efficient for the number of welding torches to be the same as the number of distinct sectors of the groove to be welded added to the required number of weld passes of each distinct sector minus one. Preferably, the number of distinct sectors into which the groove is notionally divided is greater than or equal to the number of required weld passes. There may therefore be more than 4 torches and possibly as many as 20. The number of torches used in the method to weld one circumferential side of the groove may be greater than 6.

If a first set of welding torches are used to weld one circumferential side of the groove and second set of torches are used to weld the opposite circumferential side, there may be double the number of torches. Preferably, for welding the two circumferential sides the number of distinct sectors into which the groove is notionally divided into is greater than or equal to twice the number of required weld passes. Advantageously, where both circumferential sides of a groove are being welded, the number of welding torches used may be the same as the number of distinct sectors of the groove added to twice the number of welding passes to be performed, minus two. There may therefore be 8 or more torches in simultaneous operation, each welding in a different sector. There may be more than 12 torches used in performing the method, and possibly as many as 40.

The invention also provides apparatus for welding together two pipes in accordance with the method of welding two pipes together as described above.

The apparatus may comprise a support structure arranged to be positioned around a groove. The support structure may be any shape suitable for being positioned around the groove. Preferably, the support structure is a cylinder. The support structure may include a circumferential rail to be positioned in approximate alignment with the groove and a plurality of welding torches mounted on the circumferential rail. The support structure may also includes a control unit for controlling the welding torches, the control unit being arranged to use at least some of the plurality of welding torches to perform a first welding pass of the groove, to adjust the welding characteristics of the plurality of welding torches, use at least some of the plurality of welding torches to perform a second welding pass, wherein the control unit is configured to cause at least one welding torch to weld in a first sector in the first welding pass and a second sector in the second welding pass, the second sector being different from the first.

Preferably, the support structure comprises two halves which may be separated to allow the support structure to be placed in the appropriate position and rejoined such that the support structure surrounds the groove. The two halves may be separated to allow the passage of large dimension pieces of the pipe during a pipe laying process. The two halves may be completely separable, preferably such that they are separated by up to 2200 mm. The plurality of welding torches may be spread over both halves of the support structure when it is separated or a single half of the support structure.

The support structure may be arranged to be mounted on a carriage. The carriage may comprise two parts, each part corresponding to one half of the support structure. The carriage may be mounted on rails and the rails may be overhead rails. The rails may be mounted traversely to the pipe such that the two halves of the support structure may be separated by movement of the two parts of the carriage in opposite directions along the rails.

The support structure may be clamped to the pipes which are being welded together. The support structure may be arranged such that it locates on the pipes with reference to a cut away section of a pipe. The support structure may be arranged to clamp to a cut away section of the pipe. The support structure may be arranged such that it locates on the pipes with reference to the end of a concrete sleeve around a pipe. The support structure may be arranged to clamp to a concrete sleeve around the pipe.

The plurality of welding torches may be independently operable and/or independently movable. Advantageously, this allows the control unit to adjust and move each welding torch independently and may allow for the adjustment of the welding torches should the welding requirements change, or should one of the welding torches fail.

The welding torches may be manoeuvrable between an operating position in which the welding torch is positioned in the groove such that it may weld the groove, and a disengaged position in which the welding torch is positioned away from the groove. Preferably, the welding torches are of a type disclosed in International Patent Application No. PCT/EP2007/008600, the contents of which are incorporated herein by reference. Preferably, the welding torches are mounted on a welding bug for rotational movement about an axis that is substantially horizontal to the welding bug. The welding bug may be relatively easy to manoeuvre around the pipe in the disengaged position. Preferably, the welding torch in the disengaged position is sufficiently far away from the groove to substantially prevent interference with the pipes. The welding torch in the disengaged position may allow the passing of a second welding torch along the groove, in the vicinity of the welding bug. Advantageously, this may prevent a welding torch which is in the idle state from colliding with a welding torch which is performing a welding run. Preferably, the welding torches are narrow in relation to the support structure upon which they are mounted.

Advantageously, narrow welding torches may be grouped close together. The welding torches may be so arranged that they may be grouped closer together when they are in the disengaged position. This may allow a greater number of welding torches to be mounted on the circumferential rail.

The apparatus preferably comprises a second support structure, the second support structure substantially identical to the first support structure, the first support structure being arranged to weld one circumferential half of a groove and the second support structure being arranged to weld the opposite circumferential half of the groove.

Preferably the first and second support structures are arranged to weld a groove between non-vertical pipes. Preferably the pipes are horizontal. Preferably the first support structure welds one circumferential half of a groove in a descending direction and the second support structure welds the opposite circumferential half of a groove in a descending direction. Preferably, the first support structure is arranged to weld the groove in a clockwise direction and the second cylinder is arranged to weld the groove in an anti-clockwise direction.

Advantageously, the first support structure may be arranged to weld one circumferential side of a groove when welding a first joint and the opposite circumferential side of a groove when welding a second joint. This may be quicker than returning the welding torches to their original starting positions when one joint has been welded and the pipeline moved on and another joint is arranged to be welded.

There may be four or more independently movable welding torches mounted on the first cylinder and/or four or more independently movable welding torches mounted on the second cylinder.

A further aspect of the invention is a control unit, comprising a memory including a control program configured to control the welding torches of the apparatus described above in such a way that the pipe welding apparatus performs a welding method as has been described.

Preferably, the control unit comprises a memory, the memory including a plurality of settings for executing a plurality of different welding programs. The control unit may be operated by an operator. The operator may determine which welding program is performed. The operator may input specific welding programs to be performed.

A further aspect of the invention is a pipe-laying vessel including the apparatus for welding pipes as described above. The pipe laying vessel may lay pipes in an S-lay configuration or a J-lay configuration.

A further aspect of the invention is a method of laying pipes from a pipe-laying vessel, including the method of welding together pipes on board the vessel according to the method as described above. The pipes may be laid in an S-lay configuration or a J-lay configuration.

The invention further provides a method of welding two pipes together comprising the steps of: arranging two pipes end to end, the pipe being so shaped that a circumferentially extending groove is defined between the ends of the pipes, making a first welding pass of the groove with a first welding torch to create a first weld layer in a first circumferential portion of the groove, subsequently making a second welding pass of the groove with a second welding torch to create a second weld layer on a second circumferential portion of the groove such that the second welding pass is not started until the first welding pass is complete, wherein the first and second circumferential portions at least partially overlap. Preferably, the first torch does not weld in the second circumferential portion during creation of the second weld layer. Preferably, the second torch similarly does not weld in the first circumferential portion during creation of the first weld layer.

The method may comprise the further step of subsequently making a third welding pass of the groove with a third welding torch to create a third weld layer in a third circumferential portion of the groove such that the third welding pass is not started until the second welding pass is complete, wherein the second and third circumferential portions at least partially overlap. Advantageously, the method includes the steps of making yet further welding passes of the groove with further welding torches to create further weld layers in circumferential portions of the groove, wherein each circumferential portion at least partially overlaps the one before it. There may be up to 10 welding passes of the groove.

The method may include plurality of first welding passes being performed approximately simultaneously by a plurality of welding torches on a plurality of circumferential portions of the groove. In this way, a first weld layer may be created which extends around the whole circumference of the groove. Furthermore, a plurality of second welding passes may be performed approximately simultaneously by a plurality of welding torches on a plurality of circumferential portions of the groove. Therefore, a second weld layer may be created which extends around the whole circumference of the groove. Additional weld layers may be created around the whole circumference of the groove by repeating the steps as described above.

The invention also provides a method of welding two pipes together, wherein the join between the two pipes to be welded is notionally divided into a first circumferential portion and a second circumferential portion, using a first and second set of welding torches rotating around the join, wherein the first set of welding torches weld are operational when located adjacent to the first circumferential portion and disengaged when located adjacent to the second circumferential portion and the second set of welding torches are operational when located adjacent to the second circumferential portion and disengaged when located adjacent to the first circumferential portion. The first set of welding torches may rotate round the join in the opposite direction to the second set of welding torches. The first and second circumferential portions may each have the general shape of a semicircular arc together forming a complete circumference. The first and second sets of welding torches may be arranged on opposite sides of the join between the two pipes. The first and second circumferential portions may be fixed in position.

It will be understood that any of the features described above with regards to the welding apparatus, control unit or vessel are suitable for inclusion in the method as described above, and vice versa.

DESCRIPTION OF THE DRAWINGS

Embodiments of the invention will now be described, by way of example only, with reference to the accompanying drawings of which.

DETAILED DESCRIPTION

Figure 1:
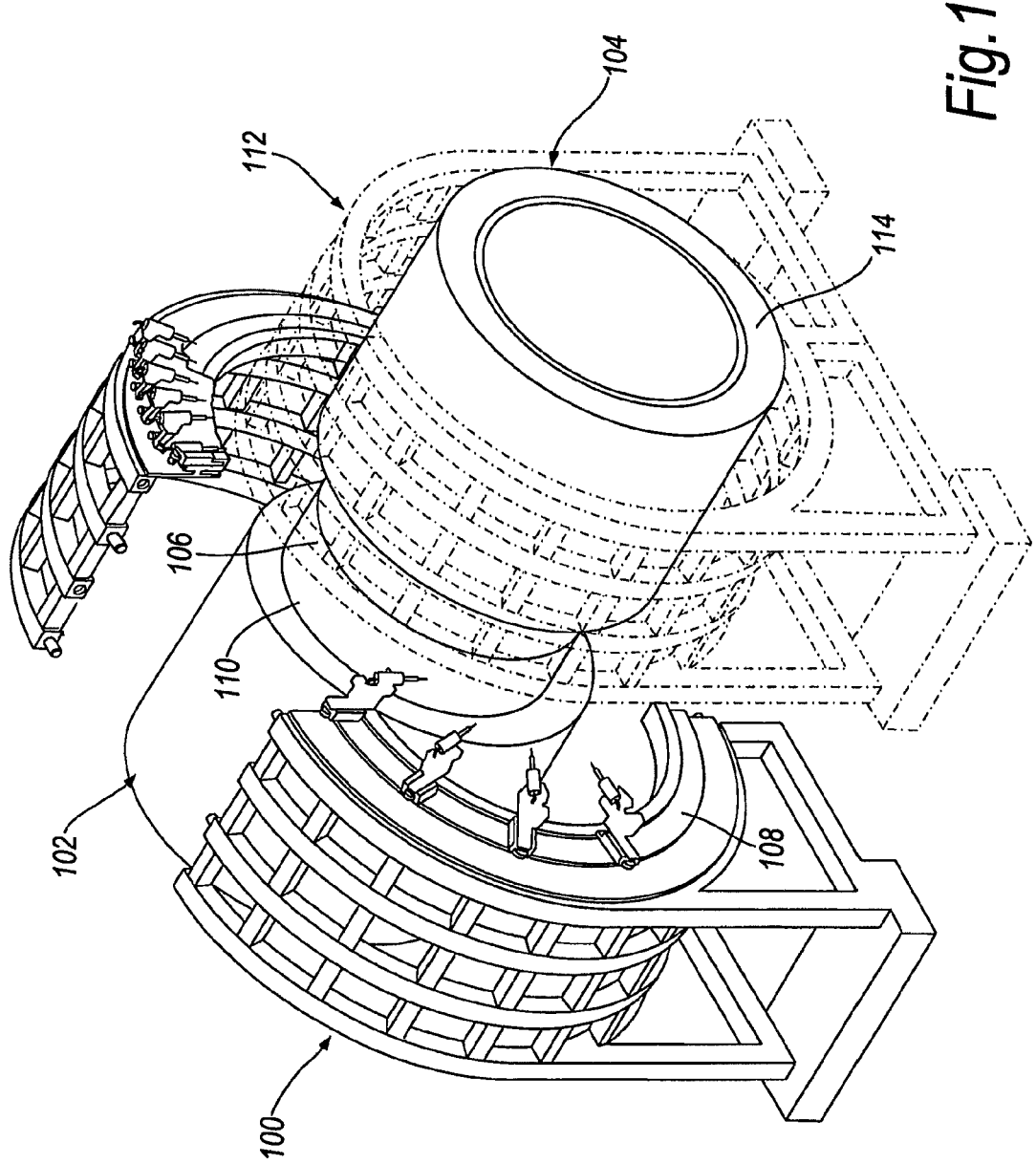
FIG. 1 shows an isometric view of an embodiment of the invention.

FIG. 1 shows a welding apparatus, comprising a support structure in the shape of a cylinder 100 which is arranged to surround a first pipe 102 and a second pipe 104, the cylinder 100 being shown while separated into two halves. In a typical pipe laying process, one of the pipes will be the end pipe of the pipeline being laid. However, for simplicities sake, in this embodiment it is not specified which of the first pipe 102 and second pipe 104 forms the end of a pipeline, if any. The first pipe 102 and second pipe 104 are approximately horizontal, as it the case when a pipeline is being laid in an S-lay configuration. A second support structure in the shape of a cylinder 112 shown in faded lines, substantially identical to the cylinder 100 is shown surrounding the pipes (the two halves of the second cylinder 112 shown joined together). The first pipe 102 and second pipe 104 include bevelled end pieces, which when placed adjacent to each other for the welding of the two pipes together creates a groove 106. In this embodiment of the invention, the cylinder 100 welds one circumferential half of the groove 106 and the second cylinder 112 welds the other circumferential half of the groove 106. The first pipe 102 and second pipe 104 are typical oil or gas pipes for laying underwater, including a steel inner pipe with an outer coating of concrete 114, the concrete 114 having been cut back and the ends of the cut back sections 110 bevelled to prepare them for welding.

In this example, the pipes have an external diameter of approximately 48 inches. However, the invention is suitable for a wide variety of pipes with different diameters, for example, from 10 inches to 60 inches (250 mm to 1525 mm) The cylinder 100 includes a rail 108 which is in approximate alignment with the groove 106 and upon which a plurality of welding torches are mounted. The rail 108 is only in approximate alignment with the groove 106, being offset towards the first pipe 102. The rail of the second cylinder 112 is offset towards the second pipe 104. This enables both circumferential sides of the groove 106 to be welded at the same time. The welding torches are arranged to be able to weld the groove 106 from their offset mounting on the rails of the first cylinder 102 and second cylinder 104. The torches may be detachably mounted to the rail 108 such that they may be removed and/or added for maintenance or adjustment of the apparatus. The cylinder 100 is separable into two halves, such that the cylinder can easily be placed around the first pipe 102 and second pipe 104 with the two halves being joined together for the welding process. The cylinder 100 includes a clamping arrangement (not shown) in order to secure the cylinder 100 in a fixed position with respect to the groove 106.

The welding torches are of the type described in PCT/EP2007/008600 which is incorporated herein by reference. The welding torches are mounted on a welding bug (not shown) for rotational movement about an axis that is substantially horizontal to the welding bug. The welding torches are manoeuvrable between a welding position in which the torch can weld in the groove 106 and a disengaged position, away from the groove. The welding bug is relatively easy to manoeuvre around the pipe in the disengaged position. The welding torch in the disengaged position is sufficiently far away from the groove to substantially prevent interference with the pipes. The torches may include a pneumatic actuator to enable easy mounting to and removal from the cylinder.

The number of welding torches to be mounted on the cylinder 100 is established in accordance with the diameter of the pipes to be joined and the number of weld layers to be created by the welding apparatus. Further details are given with reference to the embodiment shown in FIGS. 2A, 2B, 3A, 3B, and 4.

Figure 2A:
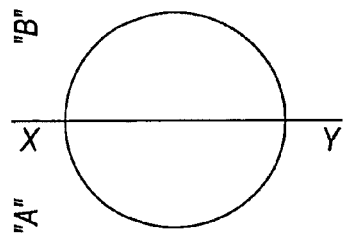
FIG. 2A shows a cross-sectional view of a pipeline suitable for use in the invention.
Figure 2B:
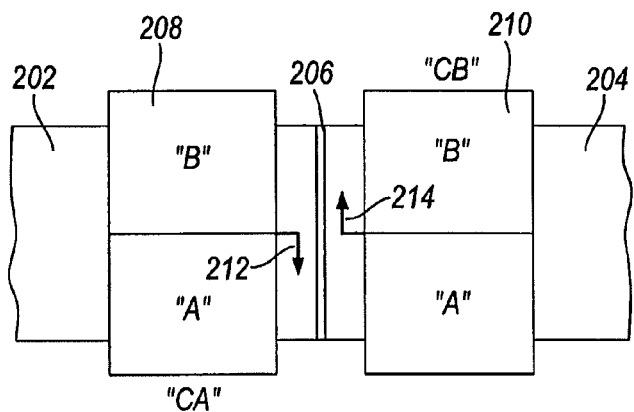
FIG. 2B shows a schematic view of the pipeline of FIG. 2A, including a pipe welding apparatus according to the invention.

FIG. 2A shows a cross section of a pipeline, with the line XY dividing the pipe longitudinally into two sections A and B (X representing the top of the pipeline, which is horizontal, and Y representing the bottom of the pipeline). FIG. 2B shows the pipeline, which comprises of a first pipe 202 and a second pipe 204, a groove 206 which is created by the first pipe 202 and second pipe 204 having bevelled edges placed end to end, a first cylinder CA and a second cylinder CB. The first cylinder CA and second cylinder CB are arranged in the same way as the cylinder 100 as described for FIG. 1, with the first cylinder CA being arranged to weld the A-side of the groove 206 and the second cylinder CB with the opposite configuration being arranged to weld the B-side of the groove 206. The arrows 212 and 214 show the directions in which the first welding cylinder 208 and second welding cylinder 210 weld the groove 206.

The A-side of the first cylinder CA corresponds with the A-side of the pipeline, the cylinder being arranged to weld the A-side of the groove 206. The B-side of the CA cylinder is used to host the resting welding torches (when they have not yet started their welding cycle or when their welding cycle has been completed).

Figure 3A:
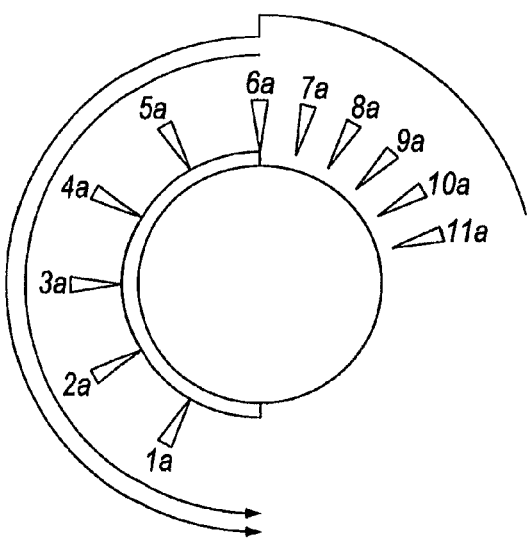
FIG. 3A shows a cross-sectional view of a pipe welding apparatus according to the invention at the beginning of the welding process.
Figure 3B:
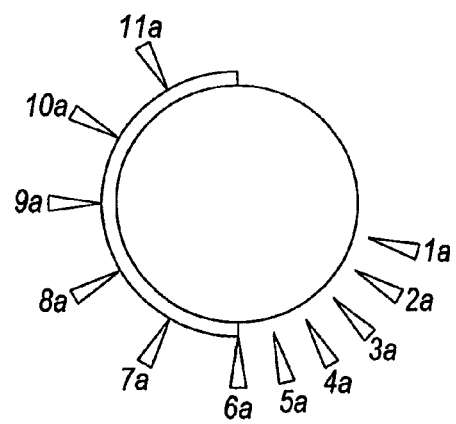
FIG. 3B shows the welding apparatus shown in FIG. 3A at the end of the welding process.

There are eleven welding torches mounted on a rail on the CA cylinder, the welding torches designated a marker from 1a to 11a. (As shown in FIGS. 3A and 3B.) Each of the welding torches are independently operable and independently movable around the rail, the welding torches controlled by a control unit (not shown).

The A-side of the groove 206 is notionally divided into six sectors, with the top, or 12 o'clock section being angle 0 degrees, down to the bottom, or 6 o'clock section, which is 180 degrees, each sector being across 30 degrees of the circumference of the groove. For example, the first sector is between 0 degrees and 30 degrees, the second sector is between 30 degrees and 60 degrees and so on until the 180 degrees position is reached.

FIG. 3A shows the welding torches 1a to 11a in the home position. The home position is the position in which the welding torches are arranged prior to the start of the planned welding sequence. The control unit is so arranged such that the home position will be reached automatically by the welding torches at the beginning of the welding phase and after ordinary maintenance of the first cylinder CA. The welding torches are arranged in this home position by the commands sent by the control unit.

In the home position the welding torches have the following positions:
The welding torch 1a is positioned at the 150 degree angle.
The welding torch 2a is positioned at the 120 degree angle.
The welding torch 3a is positioned at the 90 degree angle.
The welding torch 4a is positioned at the 60 degree angle.
The welding torch 5a is positioned at the 30 degree angle.
The welding torch 6a is positioned at the 0 degree angle.
The welding torch 7a is positioned at the −15 degree angle.
The welding torch 8a is positioned at the −30 degree angle.
The welding torch 9a is positioned at the −45 degree angle.
The welding torch 10a is positioned at the −60 degree angle.
The welding torch 11a is positioned at the −75 degree angle.

The welding torches are controlled by the control unit which includes an encoder, the encoder being used to determine the position of the welding torches with respect to the groove. Alternatively, the welding torches and control unit may be associated with an inclinometer to determine their position with respect to the pipes.

As the welding cycle begins, the welding torches 1a, 2a, 3a, 4a, 5a, and 6a, start welding simultaneously on the same welding run in the anticlockwise (descending) direction shown in FIG. 3A.

The welding torch 1a will weld the first run from the 150 degree position to the 180 degree position, creating a first weld layer in a first sector, and is then shut down and disengaged, continuing idle movement to reach a standby position on the B-side of the first cylinder CA. In the disengaged position the welding torch 1a does not obstruct welding torches on the opposite, CB, cylinder which are performing welding runs.

The welding torch 2a will weld the first run from the 120 degrees position to the 150 degrees position, creating a first weld layer in a second sector. When it reaches the 150 degree position it will automatically change welding parameters (under control of the control unit—not shown) and proceed with the second welding run from the 150 degree position to the 180 degree position, creating a second weld layer on top of the first weld layer in the first sector, after which it will shut down and move to a disengaged position and, in a similar way to welding torch 1a, continue idle movement to reach a standby position on the B-side of the first cylinder CA. As the torches move into the standby positions, they begin to move up and around the cylinder rail as shown in FIG. 3B in order to create room for more torches to complete their welding runs and move out of the way of those torches which are still performing welding runs.

Each of the welding torches 1a, 2a, 3a, 4a, 5a, and 6a, will start their welding cycle by welding a first run of a 30 degree sector and then changing welding parameters every 30 degrees and welding another 30 degree sector until the welding torch is shut down and disengaged upon reaching the 180 degree position, and idle movement is continued until a standby position is reached on the B-side of the first cylinder CA. The torches are bunched closer together when in the standby position than when being used on a welding run, in this case the idle torches being separated by 15 degrees instead of 30 degrees as for the active torches.

The welding torches 7a, 8a, 9a, 10a, 11a, are initially in a disengaged position on the B-side of the first cylinder CA. As can be seen, the torches that are not being used in a welding run are bunched closer together than those that are, in this case the idle torches being separated by 15 degrees instead of 30 degrees as for the active torches. Each of these welding torches will have idle movement around the rail 108 until they reach the 0 degree position, where they are moved into a welding position and begin welding according to the cycle as described above. However, these welding torches, 7a, 8a, 9a, 10a, and 11a, will not necessarily continue to the B-side of the first cylinder CA. The welding torches only continue to weld until the desired number of weld layers has been built up. In this example, there are 6 weld layers created.

Figure 4:
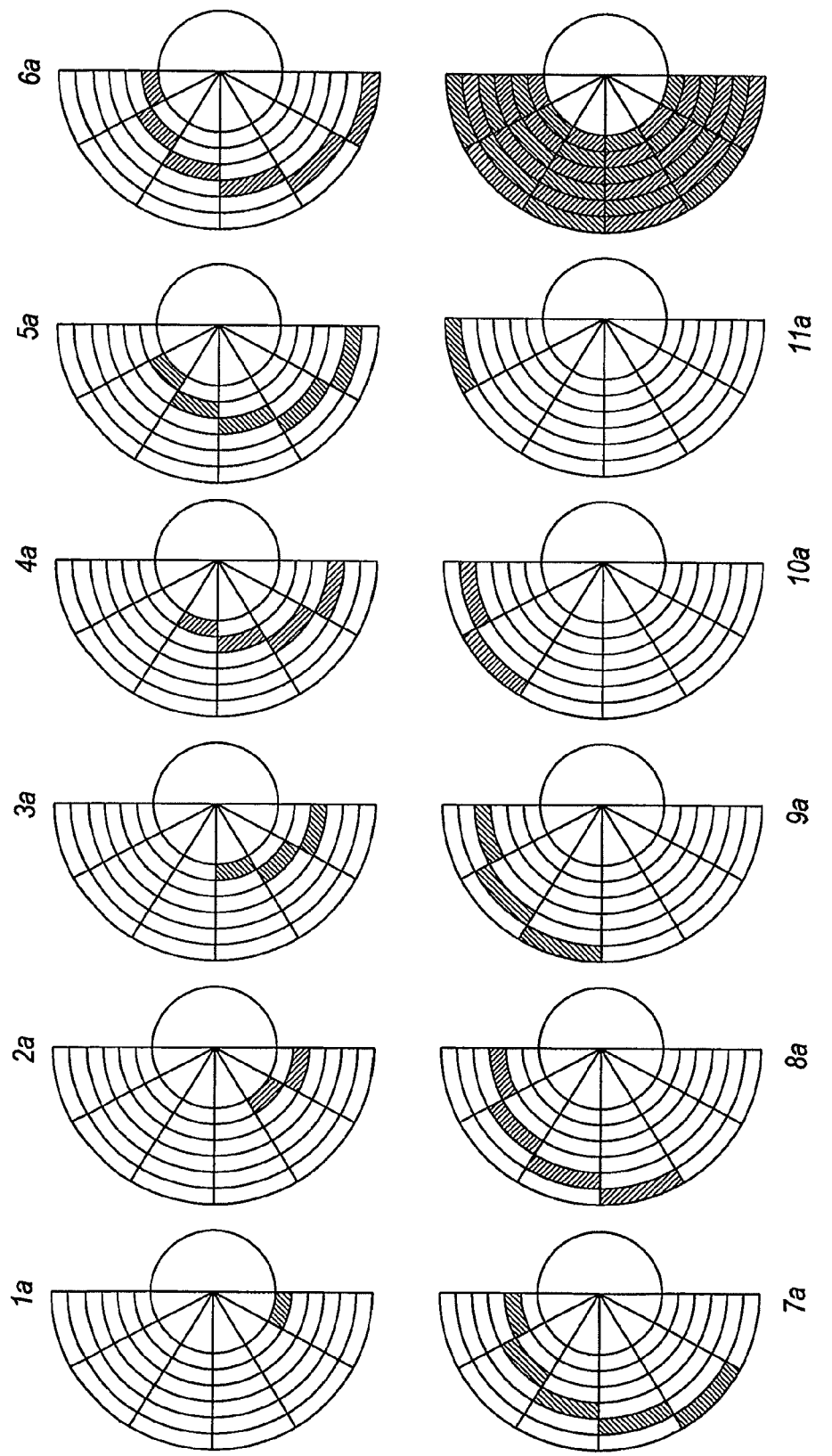
FIG. 4 is a graphical representation of the welding activity of each of the welding torches shown in FIGS. 3A *and* 3B.

FIG. 4 shows the each of the welding torches 1a to 11a and the weld layers that each welding torch creates. So, it can be seen for example, welding torch 11a only welds one sector, that from 0 degrees to 30 degrees, as it creates the sixth and final weld layer. In contrast, it can be seen that welding torch 6a welds a first layer on the first sector, a second layer on the second sector, and so on until it welds a sixth layer on the sixth sector, thereby welding each of the sectors of the A-side of the groove. It will be appreciated that the start or end of the weld performed by a given torch during a given welding pass may merge with the start or end of the weld performed by another torch as a result of the welding process. Any such merging of the welds should not be considered as the performance of a weld in two sectors.

The second cylinder CB is set up in the opposite way to the first cylinder CA, such that there are eleven welding torches 1b to 11b, which weld the B-side of the groove 206. As mentioned above, the welding torches on the second cylinder CB are offset towards the second pipe 204 and are arranged to weld the groove 206 in a descending, clockwise direction. The welding sequence is substantially the same as for the first cylinder CA. However, there is a slight delay of a few seconds before the welding sequence of the second cylinder CB starts after the welding sequence of the first cylinder CA starts, so that there is no collision between the welding torches of the first cylinder CA and second cylinder CB. In particular, the torch 6b mounted on the second cylinder CB which starts welding at the top of the groove, is held in the disengaged position when the torch 6a begins its welding run. Once the torch 6a far enough from its initial position, the torch 6b is moved into the welding position and the plurality of torches on the second cylinder CB begin their welding runs. It will be appreciated that the timings of the welding runs means that a similar offset action will occur for each of the torches that begin welding at the top of the groove, so torches 7a and 7b do not clash. Similarly, when torch 1a reaches the bottom of the groove it is moved to a disengaged position before torch 1b reaches the bottom of the groove, hence collision between the torches is avoided at the end of the welding runs as well as at the beginning. When the torches are in the idle position they are in a disengaged position away from the groove being welded. Therefore, the idle welding torches of one cylinder do not collide with either the idle welding torches or active welding torches of the other cylinder.

Once the groove has been welded as determined by the control unit the cylinders may be released from the pipeline and moved away. If the welding method and apparatus are being used in a pipe laying process, that process may then continue. Also, once the welding torches have finished the welding cycle, they are returned back to their initial home positions, ready for welding the next two pipes together.

In an alternative embodiment, the welding torches may be removed from the cylinder rail 208 and returned to their starting positions. It may not be necessary to remove all of the welding torches, only those that have been moved to an idle position on the non-welding side of either cylinder, the welding torches that remain in potential welding positions being reallocated positions in the welding sequence.

Alternatively, the first cylinder CA and second cylinder CB may be reversed in modality with the welding torches being repositioned accordingly. So, rather than the welding torches on the first cylinder CA welding the A-side in an anti-clockwise direction, they weld the B-side in a clockwise direction (and vice versa). So, the torch 5a would be repositioned and renamed as torch 1b, 4a to 2b, 3a to 3b, 2a to 4b, 1a to 5b, 11a to 6b, 10a to 7b, 9a to 8b, 8a to 9b, 7a to 10b, 6a to 11b. The maximum rotation of any torch will be less than one full round of the cylinder.

The embodiment of the invention as described with reference to FIGS. 3A, 3B, and 4, has the groove split into two circumferential halves, each circumferential half being further divided into 6 distinct sectors, with no overlapping between sectors. However, an alternative embodiment of the invention may include the sectors at least partially overlapping as the weld layers are created. For example, using the same torch arrangement as described in FIG. 3A, torch 6a may weld between 0 degrees and 30 degrees and torch 5a may weld between 30 degrees and 60 degrees, creating first weld layers, and torch 7a may weld between 5 degrees and 35 degrees, creating a second weld layer overlapping the sectors welded in the first welding run by torches 5a and 6a. This may prove advantageous for the strength of the weld.

Figure 5:
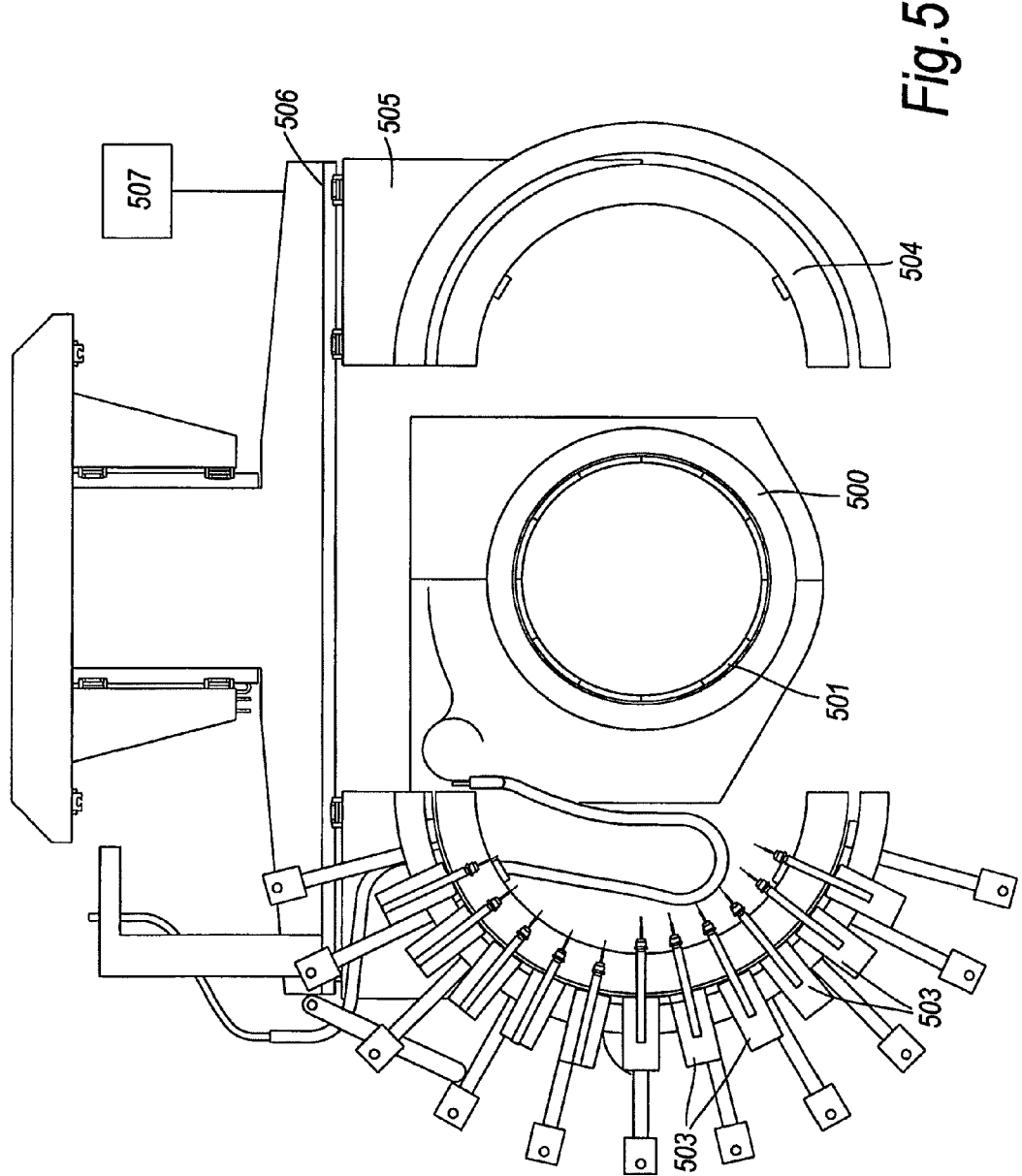
FIG. 5 shows an embodiment of the invention including the support structure as described for FIGS. 1 to 4 being mounted on a carriage.

FIG. 5 shows an embodiment of the invention similar to that described above, wherein a join 501 between two pipes 500 is welded by a plurality of welding torches 503 which are mounted on a support structure 504. The figure shows only one support structure, but the skilled man will realise that the embodiment is applicable to two support structures, such as cylinders CA and CB as described above. The support structure 504 comprises of two halves of a cylinder and is capable of being located around the two pipes 500. The support structure includes a plurality of welding torches which are capable of being manipulated as described for the embodiment above. In FIG. 5, the welding torches 503 are shown entirely on one side of the support structure 504. FIG. 5 shows each half of support structure 504 mounted on a corresponding part of a carriage 505. The carriage 505 also comprises two halves, one corresponding to each of the halves of the support structure. The two halves of the carriage 505 are mounted on a rail 506 that runs traverse to the longitudinal axis of the two pipes 500. The two halves of the carriage may be driven by a drive unit 507 to move the carriage, and hence the support structure, into a position in which the two halves of the support structure are brought together around the pipes 500 and the welding torches 503 may weld the join 501 between the two pipes 500. The two halves of the carriage may also be driven such that they separate the two halves of the support structure 504 (as shown in FIG. 5) to allow the two pipes 500 to pass through the space created.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

For example, there may be a different number of welding layers created at the groove formed between two adjoining pipes, or the number of distinct sectors of the groove may be different, with the resultant change of the number of welding torches used. For example, if 3 weld layers were to be created, with each circumferential half of the groove including four distinct sectors, 6 welding torches may be required on each cylinder. The cylinders may be adaptable to take different sized pipes and/or pipes with different welding requirements. Welding torches may be added or removed accordingly, and the control unit which dictates the action taken by the welding torches, may be adjustable depending on these requirements. In an alternative embodiment of the invention the support structure may be non-cylindrical.

It is to be understood that optional integers or features, whilst of possible benefit in some embodiments of the invention, may not be desirable, and may therefore be absent, in other embodiments. Any ranges of parameters, variables, or other values quoted herein are intended to cover the limits of the ranges inclusively.

The invention claimed is:

1. A method of welding two pipes together comprising the steps of:
   arranging two pipes end to end, the pipes being so shaped that a circumferentially extending groove is defined between the ends of the pipes;
   providing a plurality of welding torches for welding in the groove, each of the plurality of welding torches being independently movable, relative to the other welding torches, circumferentially about the groove in the same direction;
   using at least some of the plurality of welding torches to perform a first welding pass,
   adjusting the welding characteristics of the plurality of welding torches, and
   using at least some of the plurality of welding torches to perform a second welding pass, wherein
   at least one torch welds in a first sector in the first welding pass and a second sector in a second welding pass, the second sector being different from the first,
   wherein a plurality of welding passes of a section are performed in the same direction without any welding torches being required to return to a previously welded sector of the pipe, and
   previously dormant welding torches joining the welding process and previously active welding torches leaving the welding process and becoming dormant, such that, during at least part of the welding process the active welding torches are sandwiched between dormant torches.

2. A method according to claim 1, further comprising the steps of:
   adjusting the welding characteristics of the welding torches after the second welding pass, and
   using at least some of the plurality of welding torches to perform a third welding pass, wherein
   at least one torch welds in a first sector in the first welding pass, a second sector in a second welding pass, and a third sector in the third welding pass, the first, second, and third sectors being different from each other.

3. A method according to claim 1, wherein each of the welding torches used in a welding pass are operated such that each torch welds a particular sector only once.

4. A method according to claim 1, wherein the sectors are distinct from each other.

5. A method according to claim 1, wherein there is no overlap between the sectors in successive welding passes.

6. A method according to claim 1, wherein the groove has notionally been divided into two circumferential sides, a first plurality of welding torches welding one circumferential side of the groove and a second plurality of welding torches welding a second circumferential side of the groove.

7. A method according to claim 6, wherein the welding passes on the two circumferential sides of the groove are performed approximately simultaneously.

8. A method according to claim 1, wherein the two pipes are non-vertical and the welding passes are performed in a descending manner.

9. A method according to claim 1, wherein a plurality of welding passes are made, such that each welding pass comprises the step of each of the different sectors being welded by different welding torch to that which performed the preceding welding pass of each sector.

10. A method according to claim 1, wherein at least some of the plurality of welding torches perform a plurality of welding passes, each welding pass being performed on a different sector of the groove, the welding passes proceeding in a stepped arrangement.

11. A method according to claim 1, comprising the step of moving at least one welding torch not performing a welding pass into a disengaged position in which the welding torch is positioned away from the groove.

12. A method according to claim 1, wherein 4 to 40 welding torches are used.

13. A method according to claim 1, wherein the groove is divided into 4 to 20 sectors.

14. A method according to claim 1, wherein 2 to 10 welding passes are performed.

15. A method of laying pipes from a pipe-laying vessel, including the method of welding together pipes on board the vessel according to the method of claim 1.

16. A method according to claim 1, wherein each welding pass of a sector, other than the first welding pass, is performed by the welding torch which performed the preceding welding pass of a sector adjacent to the said sector, or a previous sector to the said sector.

17. A method according to claim 1, comprising:
   a welding torch performs a first welding pass at a particular weld layer, the welding torch then proceeding to an adjacent sector, whereby it performs a second welding pass on top of a weld layer previously created on the adjacent sector by a different welding torch.

18. A method of welding two pipes together comprising the steps of:
   arranging two pipes to end, the pipes being so shaped that a circumferentially extending groove is defined between the ends of the pipes; and
   providing a plurality of welding torches for welding in the groove, wherein each welding pass of the plurality of welding torches is performed in the same direction, and
   wherein each of the plurality of welding torches being independently movable, relative to the other welding torches, circumferentially about the groove; and
   previously dormant welding torches joining the welding process and previously active welding torches leaving the welding process and becoming dormant, such that, during at least part of the welding process the active welding torches are sandwiched between dormant torches.

* * * * *